(12) United States Patent
Roman et al.

(10) Patent No.: US 8,638,867 B2
(45) Date of Patent: Jan. 28, 2014

(54) METHODS AND APPARATUS FOR COMPENSATING FOR PROPAGATION DELAYS IN COORDINATED MULTI-POINT TRANSMISSION

(75) Inventors: Timo E. Roman, Espoo (FI); Tommi T. Koivisto, Espoo (FI); Mihai Enescu, Espoo (FI); Karol Schober, Helsinki (FI)

(73) Assignee: Broadcom Corporation, Irvine, CA (US)

( * ) Notice: Subject to any disclaimer, the term of this patent is extended or adjusted under 35 U.S.C. 154(b) by 243 days.

(21) Appl. No.: 13/095,241

(22) Filed: Apr. 27, 2011

(65) Prior Publication Data

US 2012/0275507 A1 Nov. 1, 2012

(51) Int. Cl.
*H04K 1/10* (2006.01)

(52) U.S. Cl.
USPC ........... 375/260; 375/262; 375/265; 375/267; 375/340; 375/343; 375/346; 375/347

(58) Field of Classification Search
USPC ......... 375/224, 226, 260, 422, 261, 262, 265, 375/267, 340, 343, 346, 347; 370/203, 204, 370/205, 208, 209, 210
See application file for complete search history.

(56) References Cited

U.S. PATENT DOCUMENTS

| 8,204,151 | B2 * | 6/2012 | Kim et al. | 375/299 |
| 2011/0103503 | A1 * | 5/2011 | Shin et al. | 375/267 |
| 2012/0099513 | A1 * | 4/2012 | Suh et al. | 370/312 |

FOREIGN PATENT DOCUMENTS

| CN | 101917381 A | 12/2010 | |
| EP | 2 437 451 A1 | 4/2012 | |
| WO | WO 2010/130101 A1 | 10/2010 | |
| WO | WO 2010/151069 | * 12/2010 | ............. H04B 7/005 |
| WO | WO 2011/017453 A2 | 2/2011 | |
| WO | WO 2012/093555 A1 | 12/2011 | |

OTHER PUBLICATIONS

"Discussion on Received Timing Difference in Downlink CoMP Transmission", Fujitsu, 3 GPP TSG-RAN1 #56, R1-090950, Feb. 2009, 4 pgs.
"Pseudo Transmission Timing Control using Cyclic Shift for Downlink CoMP Joint Transmission", Fujitsu, 3GPP TSG-RAN1 #57, R1-091956, May 2009, 8 pgs.
"Impact of propagation attenuations and delays of CoMP composite", Samsung, 3GPP TSG RAN WG1 #57bis, R1-092657, Jun. 29-Jul. 3, 2009, 8 pgs.
"Further details and benefits of deploying DC-HSDPA UEs in Single Frequency Networks", Qualcomm Incorporated, 3GPP TSG RAN WG1 Meeting #62, R1-104738, 12 pgs, Aug. 23-27, 2010.

* cited by examiner

*Primary Examiner* — Dhaval Patel
(74) *Attorney, Agent, or Firm* — Stanton IP Law

(57) ABSTRACT

Systems and techniques for communication using coordinated multi-point transmission. In one embodiment, an apparatus comprises at least one processor and a memory storing a set of computer instructions, configured. The processor is configured to cause the apparatus to determine a linear phase variation between at least first and second transmissions from first and second transmission points based at least in part on a propagation delay difference between the first and second transmissions, and transmit the phase variation information for at least the first and the second transmissions. An apparatus configured to operate as a transmission point in a network receives linear phase variation information indicating phase variation experienced by at least one user equipment resulting from a propagation delay difference between at least the apparatus and a second apparatus operating as a second transmission point and manages transmission so as to control phase variation resulting from the propagation delay difference.

14 Claims, 11 Drawing Sheets

METHODS AND APPARATUS FOR COMPENSATING FOR PROPAGATION DELAYS IN COORDINATED MULTI-POINT TRANSMISSION

FIELD OF THE INVENTION

The present invention relates generally to wireless communication. More particularly, the invention relates to improved systems and techniques for avoiding intercell interference in coordinated multipoint transmission.

BACKGROUND OF THE INVENTION

Interest in wireless communication, particularly personal wireless communication, has increased more and more during the last few decades, and user demand for the ability to transmit and receive information wirelessly has proven insatiable. Driven by high and growing demand, developers and manufacturers are constantly seeking ways to increase the information that can be transmitted and received by network infrastructure and user equipment (UE). Finding such ways mounts increasing challenges, as the desire of users for reliable, high quality service is accompanied by their reluctance to pay increased rates such as might be needed to finance new infrastructure to meet demands for service.

Techniques that allow for efficient use of equipment serve a number of goals. They allow providers to manage their costs, which may lead to increased profits, lower charges to users, or both. They allow providers to avoid the building of new infrastructure, thereby avoiding the need to petition governments for permits to build such infrastructure and avoiding resistance among the public. Efficient use of equipment can be expected to provide the various benefits that may be expected from increasing services without concomitantly increasing deployment of equipment.

The telecommunications industry is continually introducing techniques aimed at increasing efficiency and service levels. One such technique is orthogonal frequency division multiplexing (OFDM), which distributes data across subcarriers at closely spaced frequencies to achieve a higher overall data rate than the data rate per subcarrier.

Another technique that is receiving great attention is coordinated multipoint transmission, which is directed to coordination of communication to a given UE by different transmission points.

Wireless communication systems typically comprise numerous and widespread infrastructure elements, organized and allocated in various ways so that a particular UE is identified with the elements serving it at a particular time. Many UEs are served by different elements at different times. For example, a UE may switch between serving elements as it moves from one geographic location to another. Transmissions from elements serving one UE can have significant detrimental impacts on UEs being served by different elements, and coordinated multi-point communication allows for coordination of transmissions among elements to reduce such detrimental impacts.

Many wireless communication systems are organized into cells. A cell may be thought of as a geographic region served by infrastructure identified with the cell. In one exemplary system, service is provided by transmission points distributed throughout the region served by the system, with each cell comprising at least one transmission point, and with each transmission point being associated with a cell.

Each cell and the transmission points within it may be associated with a cell identifier, and the transmission points and other elements associated with a cell may identify themselves to UEs as being associated with that cell. It will be recognized that transmission points may be allocated or identified in numerous ways, and that identification of transmission points with a cell is only one example of such allocation. A transmission point comprises a single antenna, or an array of co-located antennas. In one example, a cell may be served by a single transmission point, comprising a single array of co-located antennas, with the transmission point using an identifier associated with the cell. To take another example, a cell may be served by multiple transmission points, with each of the transmission points comprising an array of co-located antennas, and with each transmission point serving the cell using the same identifier to indicate its association with the cell. Each transmission point may also use its own individual identifier, used separately from and in addition to the cell identifier. One arrangement of multiple transmission points within a cell is the case of a cell using one or more central transmission points and one or more transmission points in the form of remote radio heads.

Various notable impacts on service may occur when a UE being served by a transmission point within one cell encounters transmissions directed to a UE within a different cell by a transmission point serving that cell, but it will be recognized that impacts on service may be caused by transmission points operating in the same cell or in systems in which transmission points are not allocated to cells, and coordination between transmission points may be used as appropriate whether the transmission points belong to the same cell or different cells, or whether the system is organized into cells at all.

In systems that are organized into cells, each cell is served by one or more transmission points, and the transmission points may coordinate communication with UEs in a number of ways directed to improve service. Coordination of communication can be expected to yield improvements by increasing the average cell throughput, and is also particularly useful in reducing interference encountered by UEs operating near the edges of cells. A cell edge is a region between adjacent cells, so that UEs near an edge of a cell will be serviced by a transmission point serving the cell but can also be expected to be exposed to relatively strong signals from transmission points serving adjacent cells.

Such issues may also arise in cases in which UEs are within range of multiple transmission points generally, whether or not those transmission points belong to different cells. A transmission point can be expected to have an effective coverage area, with detectable transmissions extending beyond the effective coverage area. A UE being served by a first transmission point, but within a range at which it can detect signals from a second transmission point, may be subject to interference from the second transmission point whether or not the two transmission points happen to be serving different cells.

Transmission points serving various UEs may engage in coordination with one another in order to provide improved service. For example, in coordinated beamfoming, transmission points may coordinate their scheduling to reduce impacts on UEs they are not immediately serving.

In joint processing/joint transmission, transmission points serving a UE may engage in coordination to jointly transmit data to the UE. Multiple transmission points within range of a UE may therefore serve the same UE at the same time, and thus provide stronger signals instead of presenting interference. Such a technique increases spectral efficiency of a communication system.

SUMMARY OF THE INVENTION

In its various aspects, embodiments of the present invention recognize that various techniques used to improve spectral efficiency may each present their own set of challenges and constraints, so that understanding and dealing with the challenges and constraints presented by a technique is needed in order to achieve its full benefit.

Jointly processed transmission by multiple transmission points is directed toward providing improved service to UEs served by the transmission points. Such improvement of service is achieved by coordinating the time and frequency of transmissions carried out by transmission points so that their transmissions arrive simultaneously and combine coherently at the UEs to which they are directed. However, transmission points are typically separated in space from one another, and can be expected to lie at different distances from a UE. Therefore, transmissions from different transmission points to a single UE may be expected to exhibit different propagation delays. The equivalent downlink coordinated multi-point channel to a given UE may be looked at as a composite channel with an aggregated delay profile assembled from the transmission channels between the UE and the transmission points communicating with the UE. The overall delay spread of such a coordinated multi-point composite channel is typically greater than the range of any one channel between a transmission point and the UE.

The differing propagation delays of one transmission point as compared to another introduce phase modulation in the frequency domain. The reason for such phase modulation is that a UE can typically synchronize in time and frequency to only a single transmission point, and the signal components from other transmission points that are spatially separated from the transmission point to which the UE is synchronized will exhibit additional propagation delays. The phase modulation induced by propagation delays increases the frequency selectivity of the aggregated radio channel. Techniques relying on phase coherence among the coordinating transmission points, such as for example joint processing coordinated transmission, suffer greatly from such additional phase modulation.

Various embodiments of the invention provide mechanisms to manage multi-point transmissions so as to minimize detrimental impact caused by propagation delay differences.

According to a first embodiment of the invention, an apparatus comprises a processing system comprising at least one processor and a memory storing a set of computer instructions. The processing system is configured to cause the apparatus to determine a phase variation based at least in part on a propagation delay difference between at least a first radiofrequency transmission from at least a first transmission point and at least a second radiofrequency transmission from at least a second transmission point, and transmit the phase variation information for at least the first and the second transmissions.

According to a second embodiment of the invention, a method comprises receiving at least a first radiofrequency transmission from a first transmission point and a second radiofrequency transmission from a second transmission point. The method further comprises operating a processor to determine a phase variation based at least in part on a propagation delay difference between at least the first and the second transmission point; and transmitting the phase variation information to at least one of the transmission points.

According to a third embodiment of the invention, an apparatus comprises a processing system comprising at least one processor, and a memory storing a set of computer instructions. The apparatus is configured to operate as a transmission point in a cellular communication network. The processor is configured to control communication by the apparatus so as to conduct coordinated multi-point transmission (CoMP) with at least one user equipment operating in the network, receive phase variation information indicating phase variation experienced by at least one user equipment resulting from a propagation delay difference between at least the apparatus and a second apparatus operating as a second transmission point and manage transmission to the user equipment so as to control phase variation resulting from the propagation delay difference.

These and other embodiments and aspects are detailed below with particularity.

DETAILED DESCRIPTION OF THE PREFERRED EMBODIMENTS

Figure 1:
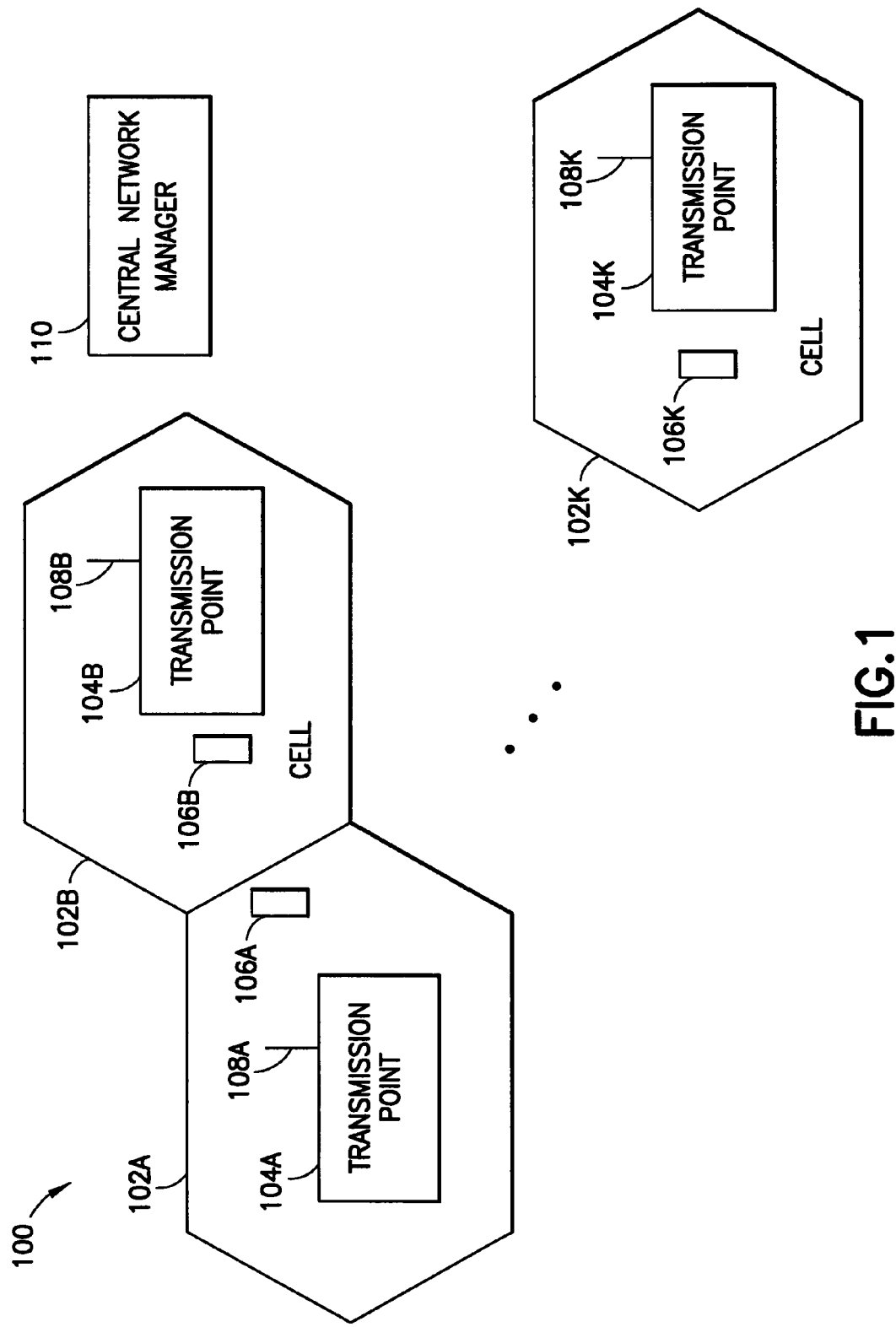
FIG. 1 illustrates a wireless communications network according to an embodiment of the present invention.

FIG. 1 illustrates a wireless communication network 100 according to an embodiment of the present invention. The network 100 operates in a plurality of cells 102A, 102B, . . . 102K. In the interest of simplicity, only the cells 102A, 102B, and 102K are illustrated here, but it will be recognized that a network such as the network 100 will typically comprise a large number of cells. The cells represent geographic areas, each served by one or more transmission points, with the transmission points serving each of the cells represented here in consolidated form as transmission points 104A, . . . , 104K, respectively. The transmission points 104A, . . . , 104K serve UEs 106A, . . . , 106K, of which the representative UEs 106A, 106B, and 106K are illustrated here. The transmission points 104A, . . . , 104K communicate with the UEs using the antennas 108A, . . . , 108K respectively.

The network 100 also includes a central network manager 110, which may perform various functions to manage the operation of the transmission points 104A, . . . , 104K. For example, the central network manager 110 may receive information relating to channel conditions experienced by various UEs, either from the UEs directly or relayed from transmission points communicating with the UEs, and may direct the operation of one or more transmission points based on the information received. The central network manager 110 is illustrated separately here, but it will be recognized that one of the transmission points, such as the transmission point 104A, may perform network management operations such as evaluating channel information reports from UEs communicating with other transmission points and directing the operation of other transmission points in addition to managing itself.

For simplicity, only a few cells and UEs are illustrated and discussed here, but it will be recognized that networks according to embodiments of the present invention may comprise thousands of cells and millions of UEs. For simplicity, each cell is depicted as being served by only one transmission point, but it will be recognized that a cell may be served by multiple transmission points distributed at various locations within the cell, with each transmission point being associated with an identifier for the cell it serves and using the identifier in some or all of its communications. The identifier may, for example, appear in one or a plurality of reference, or pilot, signals transmitted by the transmission point, and may be used by a UE to identify the transmission point and the cell. The identification of the transmission point and the cell may be used by the UE in channel state estimation functions.

In some embodiments, one or more cells may lie fully or partially within another macro-cell. For example, a wireless hotspot is a cell created by a device typically operating in a macro-cell. In other embodiments, distributed antennas within a macro cell may be represented by remote radio heads, each of which may constitute a transmission point and each of which may be configured to be associated to the same cell identifiers as the macro cell, or different identifiers, depending on design choices.

The network 100 provides voice and data services and is directed toward providing users with a high data rate. A high data rate may be characterized as a high rate symbol stream arriving at a UE, and to this end, the various transmission points employ transmission protocols directed toward providing such a high rate over the available transmission bandwidth. One such protocol is OFDM transmission of data, distributing data across subcarriers at closely spaced frequencies, so that the total data carried across subcarriers can achieve a high rate while maintaining a transmission rate per subcarrier that is lower than the overall data rate provided.

This use of subcarriers provides a high data rate, but requires careful management to avoid subcarrier interference and, thus, intersymbol interference. Added difficulties arise for UEs, such as the UE 106A, which is near the edge of the cell 102A. The UE 106B is shown as located in the cell 102B, relatively near to the transmission point 104B and therefore away from the edge of the cell 102B. The transmission point 104B transmits signals while serving the UE 106B and other UEs that may be present in the cell 102B, and these signals may affect UEs in neighboring cells. A UE near the edge of a cell is served by the transmission point serving in that cell, but it is exposed to relatively strong transmitted signals from neighboring cells. Thus, the UE 106A receives and processes signals from the transmission point 104A, but is exposed to signals from the transmission point 104B serving the neighboring cell 102B. These signals from the transmission point 104B tend to cause interference affecting the UE 106A, but the network 100 employs various mechanisms according to exemplary embodiments of the present invention to reduce such interference. In order to reduce interference caused by the transmission point 104B to the UE 106A, the transmission points 104A and 104B may engage in joint processing, in which the transmission points 104A and 104B transmit the same data over what appears to the UE as a composite channel, with the data being differently precoded among the transmission points involved in the transmission, so that coherent combining gains are achieved upon reception at the UE. The geographical separation between the transmission points 104A and 104B causes propagation delay difference between associated signal components because the UE 106A is synchronized to the transmission point 104A.

The transmission points 104A and 104B may suitably transmit data using orthogonal frequency division multiplexing. In one example, each OFDM symbol comprises a cyclic prefix. The cyclic prefix of an OFDM symbol is a repetition of the end of the OFDM symbol, and use of the cyclic prefix as a prefix to each OFDM symbol helps to reduce intersymbol interference.

As noted above, the UE 106A is described here as operating near the edge of the cell 102A, but the apparatus and techniques described here may be carried out for numerous UEs operating at any of numerous locations within cells.

Coordinated multi-point transmission may include various techniques, such as coordinated beamforming and joint processing. In coordinated scheduling, transmission to a single UE is conducted by one or more transmission points serving the UE, for example, transmission points belonging to a single cell referred to as the serving cell. Scheduling is dynamically coordinated between the transmission point or points and other transmission points within a range to cause interference, such as transmission points serving an adjacent cell. The scheduling is coordinated so as to reduce the interference between different transmissions.

In joint processing, the transmission to a single UE is simultaneously transmitted from multiple transmission points. Depending on the location of the UE with respect to the various transmission points, the transmission may be accomplished by transmission points distributed across more than one cell or by transmission points within a single cell. The multi-point transmission will appear as a single transmission comprising single or multiple streams. In the present example, the transmission points 104A and 104B would simultaneously transmit data to the UE 106A. In another example, the transmission points 104A and 104B may each simultaneously transmit to the UEs 106A and 106B, with the transmission points 104A and 104B coordinating their transmissions to form a composite channel conducting communications to the UE 106A, and another composite channel conducting communications to the UE 106B.

Depending on the distribution of transmission points within a cell and the location of the UE, multiple transmission points detected by the UE may belong to the same cell or to different cells. That is, a UE at one location within a cell served by multiple transmission points may detect multiple transmission points associated with that cell, and a UE at another location within the same or another cell may detect transmission points distributed across cells.

It will be noted that the antennas used by the transmission points 104A, . . . , 104K are geographically separated. Therefore, for example, signals arriving from the transmission points 104A and 104B at the UE 106A are subject to different propagation delays with respect to one another. Such delay differences present significant obstacles to jointly processed data transmission from these transmission points using OFDM modulation. The obstacles include difficulties in achieving coherent combining gains at the UE.

When the delay spread of the propagation channel exceeds the cyclic prefix length or duration, inter-symbol interference occurs and breaks the orthogonality of the transmission, requiring a significantly more complex channel equalization procedure by the UE. In addition, even in cases in which the cyclic prefix length is not exceeded, channel estimation presents significant difficulties because the propagation delay spread renders the channel frequency response more frequency selective. A UE such as the UE 106A transmits channel state information (CSI) to the transmission point by which it is served. Such channel state information may be transmitted in the form of uplink feedback signaling, for example. The channel state information comprises information describing known channel properties of the communication link, as experienced by the UE, and allows the transmission point to adapt its transmissions to the channel properties. In the presence of high selectivity caused by propagation delay differences, channel estimation filtering must be adjusted to account for this high selectivity. For example, channel estimation filtering must be adjusted according to a smaller coherence bandwidth with a lower processing gain. Higher density for reference signals used in channel estimation may also be required. Such higher density for reference signals leads to increased reference signal overhead and decreases spectral efficiency by requiring the dedication of more bandwidth to reference signals rather than data.

Furthermore, the frequency selectivity of the channel affects transmit precoding gain and also requires accurate frequency selective channel state information feedback with very fine user equipment feedback granularity in the frequency domain, leading to high or even excessive uplink feedback overhead. These requirements can overwhelm the advantages provided by coordinated multi-point transmission.

Various embodiments of the present invention are discussed below, and take into account the knowledge that the differences in propagation delay of signals arriving at a single UE from different transmission points manifest themselves as phase modulations, and these phase modulations are entirely deterministic and each depend on a single parameter. Therefore, the various UEs operating in networks according to embodiments of the present invention, such as the UE 106A operating in the network 100, are able to determine the phase modulations they experience between signals and transmit this information in such a way that it can be used by transmission points to manage their transmissions so as to compensate for the phase variations.

The following discussion presents an exemplary model of phase modulation caused by propagation delay differences, showing the deterministic nature of the phase modulation and the parameter on which it depends. A UE with knowledge of this parameter can easily compute the phase modulation that it experiences and convey this information to the network 100. For example, the UE may convey the phase modulation information to its serving transmission point, and then the serving transmission point may relay the phase modulation information to a central entity controlling the transmission points, such as the central network manager 110. The central network manager 110 may, for example, provide specific information to the transmission points indicating the compensation they need to perform. As an alternative, a transmission point may receive the phase modulation information relating to itself, so that it can then compute and perform compensation based on the phase modulation information.

Suppose that a network such as the network 100 comprises a total of K transmission points, each being equipped with $N_t$ transmit antennas. Consider the received signal at the UE of interest, for example, UE 106A. Its serving cell is the cell 102A, and the transmission point serving the cell 102A is here regarded as a reference transmission point, indexed by k=0. If the UE 106A employs $N_r=2$ receive antennas, the received signal vector for the UE of interest at n-th subcarrier may be expressed as:

$$Y(n) = H^{(0)}(n)W^{(0)}(n)X^{(0)}(n) + \sum_{k=1}^{K-1} H^{(k)}(n)W^{(k)}(n)X^{(k)}(n) + N(n), \quad \text{Eq. (1)}$$

where:

n is the subcarrier index with n=0, ..., N-1 and N is the fast Fourier transform (FFT) size;

Y(n) is the $N_r \times 1$ received signal vector at the n-th subcarrier at the UE of interest which uses a reference transmission point indexed by k=0;

$X^{(k)}(n)$ is the $N_s \times 1$ transmit signal vector at k-th transmission point and n-th subcarrier, assuming a total of $N_s$ parallel data streams;

$W^{(k)}(n)$ is the $N_t \times N_s$ precoding matrix at k-th transmission point and n-th subcarrier;

$H^{(k)}(n)$ is the $N_r \times N_t$ channel matrix at n-th subcarrier between the transmit antennas of the k-th transmission point and the Nr receive antennas of the UE of interest;

N(n) is the $N_r \times 1$ noise component at n-th subcarrier.

The channel matrix $H^{(k)}(n)$ may further be expressed as:

$$H^{(k)}(n) = [H_{r,t}^{(k)}(n)]_{r=1,\ldots,N_r, t=1,\ldots,N_t}, n=0,\ldots,N-1, \quad \text{Eq. (2)}$$

where each entry of the channel matrix corresponds to the channel frequency response at n-th subcarrier between the t-th transmit antenna at the k-th transmission point and the r-th receive antenna at the UE. Each entry of the channel matrix $H^{(k)}(n)$ is computed as follows:

$$H_{r,t}^{(k)}(n) = \frac{1}{\sqrt{N}} \sum_{l=0}^{N-1} h_{r,t}^{(k)}(l) e^{-j\frac{2\pi l n}{N}}, \quad \text{Eq. (3)}$$

$$n = 0, \ldots, N-1,$$

where the corresponding discrete channel impulse response vector in time-domain between the t-th transmit antenna at the k-th transmission point and the r-th receive antenna at the UE is defined as follows:

$$h_{r,t}^{(k)} = \left[ \underbrace{0 \ldots 0}_{d^{(k)}} \underbrace{h_{r,t}^{(k)}(0) \ldots h_{r,t}^{(k)}(L^{(k)}-1)}_{L^{(k)}} \underbrace{0 \ldots 0}_{N-L^{(k)}-d^{(k)}} \right]^T, \quad \text{Eq. (4)}$$

where $L^{(k)}$ is the length in samples of the non-zero part of the above channel impulse response (CIR).

The parameter $d^{(k)}$ is defined as the propagation delay difference in samples between the first non-zero channel tap associated to the k-th transmission point and the reference transmission point indexed by k=0. For convenience, it is assumed here that the UE is perfectly time-synchronized to its reference transmission point and thus $d^{(0)}=0$, but the relationships presented here may be extended to cases in which the reference transmission point does exhibit a propagation delay and the value of $d^{(0)}$ is not equal to 0. The frequency response in Eq. (3) may be further expanded as follows:

$$\bar{h}_{r,t}^{(k)}(n - d^{(k)}) = h_{r,t}^{(k)}(n) \xrightarrow{FFT} H_{r,t}^{(k)}(n) = \quad \text{Eq. (5)}$$

$$e^{-j\frac{2\pi d^{(k)} n}{N}} \frac{1}{\sqrt{N}} \sum_{l'=0}^{L^{(k)}-1} \bar{h}_{r,t}^{(k)}(l') e^{-j\frac{2\pi l' n}{N}} = e^{-j\frac{2\pi d^{(k)} n}{N}} \bar{H}_{r,t}^{(k)}(n)$$

with the following definitions:

$$\bar{h}_{r,t}^{(k)} = \left[ h_{r,t}^{(k)}(0) \ldots h_{r,t}^{(k)}(L^{(k)}-1) \underbrace{0 \ldots 0}_{N-L^{(k)}} \right]^T \quad \text{Eq. (6)}$$

and $$\bar{H}_{r,t}^{(k)}(n) = e^{-j\frac{2\pi d^{(k)} n}{N}} \frac{1}{\sqrt{N}} \sum_{l=0}^{L^{(k)}-1} \bar{h}_{r,t}^{(k)}(l) e^{-j\frac{2\pi d n}{N}}.$$

It is noted that $\bar{h}_{r,t}^{(k)}$ is equivalent to the channel impulse response (CIR) in the case in which the UE would be time-synchronized to the k-th transmission point, and $\bar{H}_{r,t}^{(k)}(n)$ is the corresponding channel frequency response (CFR) at the n-th subcarrier.

Finally the following input-output relationship is obtained for the UE of interest synchronized to the transmission point indexed by k=0 is given by:

$$Y(n) = H^{(0)}(n)W^{(0)}(n)X^{(0)}(n) + \sum_{k=1}^{K-1} e^{-j\frac{2\pi d^{(k)} n}{N}} \bar{H}^{(k)}(n)W^{(k)}(n)X^{(k)}(n) + N(n). \quad \text{Eq. (7)}$$

From Eq. (7) it becomes clear that propagation delay difference introduces a phase modulation between the k-th transmission point (k≠0) and the reference transmission point (k=0), and that this induced phase modulation is a fully deterministic function of the subcarrier index n and the propagation delay difference parameter $d^{(k)}$. The propagation delay difference parameter $d^{(k)}$ could be either a positive or a negative number. Cases may occur in which the propagation delay from a transmission point of interest is less than that of the reference transmission point, and in such cases the value of $d^{(k)}$ would be negative. The phase variation experienced by a given UE for a k-th transmission point relative to the reference transmission point k=0 is described by the following equation:

$$\Delta_{\varphi}^{(k)}(n_1 - n_2) = e^{-j\frac{2\pi d^{(k)}(n_1 - n_2)}{N}} = \Delta_{\varphi}^{(k)}(S) \quad \text{(Eq. 8)}$$

A UE, therefore, may compute the phase variation at a subchannel n caused by transmissions from a transmission point k by evaluating the value $d^{(k)}$ and using the value $d^{(k)}$ in equation (8) to compute the value of $\Delta_{\varphi}^{(k)}(S)$. This value may then be conveyed to the transmission point k, each of which may then use the information to perform pre-compensation to minimize the phase variation.

Figure 2:
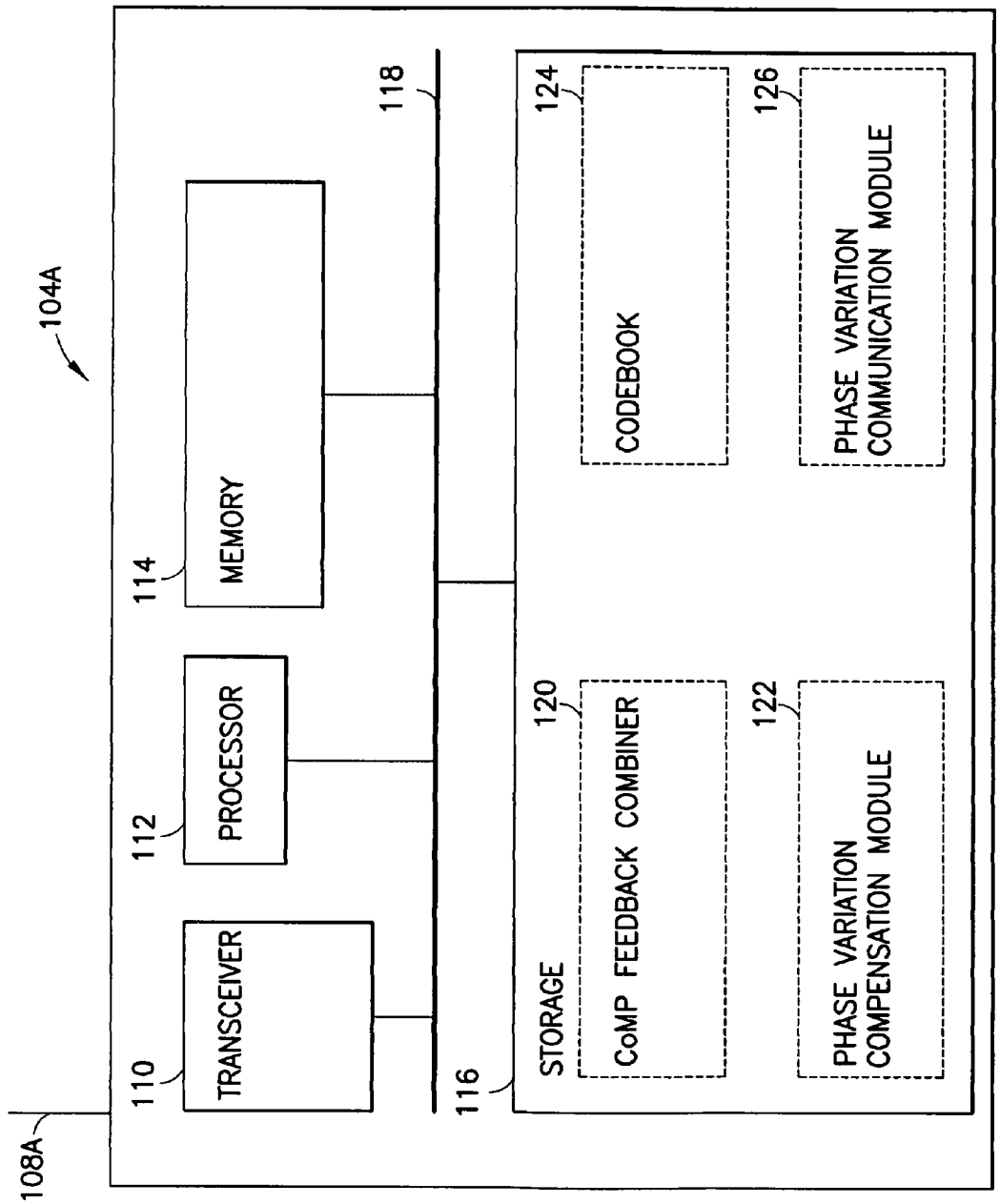
FIG. 2 illustrates details of a transmission point according to an embodiment of the present invention.

FIG. 2 illustrates additional details of the transmission point 104A, operating in the cell 102A. The transmission point 104A comprises the antenna 108A, a transceiver 111, a processor 112, memory 114, and storage 116, communicating over a bus 118. It will be recognized that the transmission points serving other cells may reflect a configuration similar to that of the transmission point 104A, or any of a number of different configurations, so long as the configuration or configurations chosen allow the carrying out of operations needed to receive phase variation information and perform compensation based on the phase variation information.

The transmission point 104A suitably employs a CoMP feedback combiner 120 and a phase variation compensation module 122, each of which may be implemented as a program of instructions residing in storage 116 and transferred to memory 114 as needed for execution by the processor 112. The CoMP feedback combiner coherently combines feedback from each transmission point within each sub-band, and conveys appropriate information relating to this feedback to other transmission points serving cells in the network 100.

The transmission point 104A receives phase variation information indicating a phase variation experienced by the UE 106A and processes this information to allow for pre-compensation of the phase variation effect caused by the transmission point 104A. The phase variation compensation module 122 manages the transmissions provided by the transmission point 104A to pre-compensate for the effect of the phase variation at the affected UEs.

As discussed in greater detail below, each UE reporting phase variation information suitably provides the report in the form of a codeword associated with an entry in a stored codebook comprising a plurality of phase variation values, each indexed to a specific codeword. Therefore, the transmission point 104A stores a codebook 124 comprising phase variation values indexed to codewords, and when the transmission point 104A receives a codeword from a UE reporting phase variation information, the phase variation compensation module 122 consults the codebook 124 and retrieves the phase variation value associated with the codeword. The codebook 124 may, for example, be based on an M-PSK complex alphabet where M is an integer value. The quantized version of the phase variation for the k-th transmission point, that is, $\Delta_{\varphi}^{(k)}(S)$, can be represented by a very small number of bits, allowing for low signaling overhead as compared to the overall bandwidth of the network 100. In addition, CoMP operation is frequently directed toward low mobility UEs, that is, for UEs traveling at a relatively low velocity. In such cases, the offset will not be expected to change rapidly over time, so that communication of phase variation information from a UE such as the UE 106 to a transmission point such as the transmission point 104A can be carried out over a relatively long timescale.

The selection of M-PSK, that is, 2-PSK, 4-PSK, or higher values, may suitably be tied to quantization error exhibited by CoMP multi-transmission point feedback combiners, such as the combiner 120, operating in the network 100. Multi-transmission point feedback combiners are employed to coherently combine the feedback of transmission points within a sub-band, and the M-PSK operation of the combiners results in an associated quantization error. For example, if combiners operate using 4-PSK, the quantization error will be expected to be ±2π/8, so that the delay compensation per sub-band should be taken from the M>8 PSK alphabet.

The other transmission points employ similar mechanisms, and the transmission point 104A may transfer phase variation information for the UEs which it serves to the other transmission points, and each of the other transmission points may do likewise. The transmission point 104A serves the cell 102A, which is the node in which the UE 106A operates. Therefore, the transmission point 104A may suitably employ a phase variation communication module 126, to relay phase variation information received from the UE 106A and other UEs served by the transmission point 104A to other transmission points in the network 100.

Such an approach allows use of communication mechanisms operating between the various transmission points and avoids a need for UEs such as the UE 106A to report phase variation information to each transmission point that may need the information. It will be recognized, however, that each UE may suitably have the capability to report phase variation information to all transmission points needing this information from the UE, and that such an implementation may be used whenever desired.

It will also be recognized that the phase variation communication module 126 may suitably be implemented as a stored set of program instructions residing in storage 116, and that such an implementation allows flexibility in operation, so that in various implementations the transmission point 104A may report phase variation information received from UEs or not, based on operational parameters in effect at various times, and that the transmission point 104A may report phase variation received from some UEs and not others, and that the times at which the transmission point 104A reports phase variation information to other transmission points and the UEs for which phase variation is reported may change over time according to explicit selections or pre-established criteria.

Figure 3:
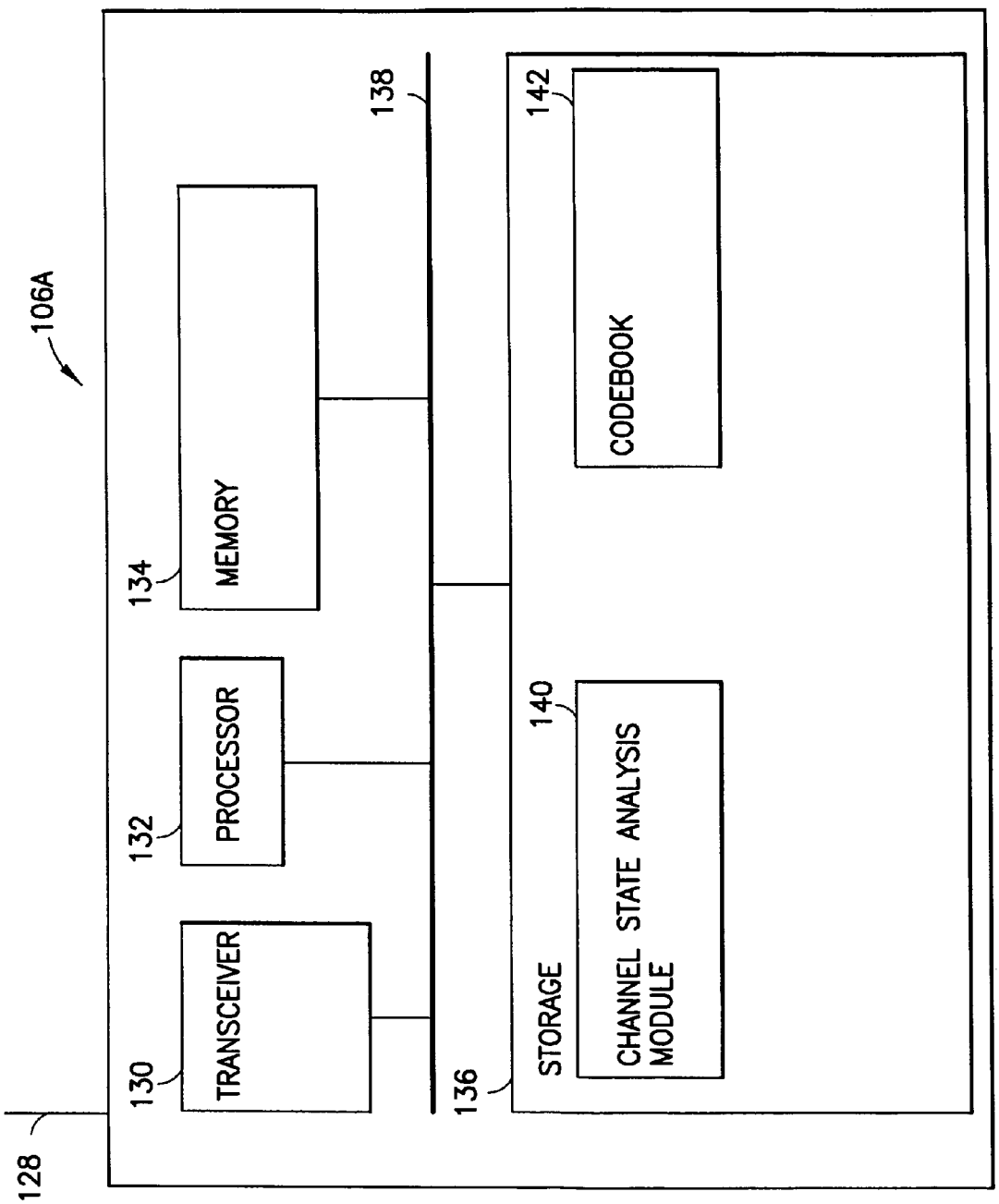
FIG. 3 illustrates details of a UE according to an embodiment of the present invention.

FIG. 3 illustrates additional details of the UE 106A, showing an antenna 128, a transceiver 130, a processor 132, memory 134, and storage 136, communicating over a bus 138. As noted above, the propagation delay difference caused by the geographic separation of the transmission points coordinating their transmissions manifests itself as phase modulation. The present invention recognizes that the phase modulation induced by the propagation delay difference is entirely deterministic and depends on a single parameter. According to an exemplary embodiment of the invention, the UE 106A measures information describing the relative phase variation experienced within a given frequency sub-band and reports this information to the network 100, for example, by reporting the information to the transmission point 104A. Depending on the configuration of the network 100, the transmission point that is directly communicating with the UE 106A, or another transmission point or entity to which the UE 106A reports the phase variation information, may perform operations using the information, or may relay the information elsewhere, such as to the central network manager 110 or to one or more of the individual transmission points to which the information relates. Specifically, for each transmission point k whose signal the UE 106A detects, the UE 106A measures the value $d^{(k)}$ representing the propagation delay experienced by the UE 106A for the transmission point k with respect to a reference transmission point. The reference transmission point may be perfectly or close to perfectly time synchronized to the UE or may deviate from perfect synchronization by a known quantity.

To this end, the UE 106A implements a channel state analysis module 140, suitably implemented as a set of program instructions residing in storage 136 and transferred to memory 134 as needed for execution by the processor 132. The UE 106A receives signals from the transmission point 104A, which may be designated as the reference transmission point, and all additional transmission points whose signals it detects.

The channel state analysis module 140 suitably determines channel state information, which includes channel quality information (CQI), precoding matrix index (PMI) feedback information, and rank indicator information (RI). The UE 106A reports the channel state information, including the phase modulation information, to the network 100. In one exemplary case, reporting of channel state information, including phase variation, is performed for each transmission point from which the UE is configured to report this information. In another exemplary case, the channel state information may be reported jointly for the set of transmission points for which the UE reports channel state information.

The UE 106A may report channel state information, including phase modulation information, over an uplink to an appropriate element of the cell 102A in which it is operating, and this element may relay the channel state information and phase modulation to appropriate entities. The reported information can typically be expected to relate to the phase difference or linear phase variation observed for a specific frequency sub-band. This linear phase variation relates to a given frequency sub-band which may comprise one or more of a precoding resource group (PRG), a physical resource block (PRB), a single subcarrier, a predefined sub-band, or a sub-band signaled to the UE 106A. A number of mechanisms for determining the phase variation value exist. For example, the channel state analysis module 140 may estimate the timing offset normally in the time domain and convert the timing offset to a frequency domain phase value. Alternatively, the channel analysis module 132 may estimate the phase variation value from the estimated frequency domain channel by estimating the linear phase change directly from the channel estimate.

As a further alternative, the channel state analysis module 140 may perform the analysis as part of the precoder selection process. The transmission point 104A and similar transmission points will frequently be expected to be an eNodeB, and precompensation is performed at the enodeB using a pair of phase and PMI values. In this approach to determining the phase value, the channel state analysis module 140 determines a phase+PMI pair which yields optimum performance, for example optimum throughput, when precompensation at the eNodeB is performed according to the phase+PMI value. This approach has the advantages of testability in operation according to the 3GPP standard and its expected successors, because it is easy to verify the interoperability between the UE 106A and a transmission point 104A implemented as an eNodeB. This approach can also be expected to produce the optimum phase value.

In order to report the phase variation information in an efficient manner with low overhead, the UE 106A may suitably implement a codebook 142, residing in storage 136. The codebook suitably comprises an index of code values, with each code value corresponding to a specific phase difference. The codebook 142 may store real or complex values. One exemplary codebook implementation, for example, is a codebook having a constant modulus alphabet (M-PSK, M={2, 4, 8, 16, 32, 64, ... } where each value in the codebook corresponds to a single phase difference.

The information relating to the phase variation may be jointly encoded together with the PMI for a given measured cell, or transmitted separately in its own CSI report. Uplink bandwidth consumed in feedback-oriented communications between UEs and equipment points is always a consideration, and one factor favoring joint encoding of phase variation information with wideband or long-term CSI is that in many situations, the relative propagation delay would not be expected to change on a fast timescale. Even in cases in which a report is especially created to report phase variation information, it could be transmitted on a long-term basis, that is, with low periodicity and thus a low uplink overhead.

Various communication protocols provide avenues for transferring phase variation information from UEs such as the UE 106A to transmission points such as the transmission point 104A. If the network 100 is implemented as a 3GPP LTE system or an expected successor of such systems, the UE 106A may transmit the code representing phase variation information on a physical uplink control channel or a physical uplink shared control channel.

The UE 106A reports channel state information to the network or directly to one or a plurality of transmission points or to any entity within the network in control of the transmission points. For example, the UE 106A may report channel state information to an appropriate element of its serving cell transmission point 104A. The channel state information includes phase variation information computed for each transmission point for which the UE 106A receives signals strong enough to be relevant. The channel analysis module 138 computes phase variation information for each of N transmission points, and depending on design choices for the network 100, the phase variation information for the N-th transmission point may be reported in an absolute manner, as the phase corresponding to propagation delay relative to a reference transmission point, such as the transmission point 104A, or in a differential manner as the phase corresponding to the propagation delay relative to the (N-1)-th reported transmission point.

Figure 4:
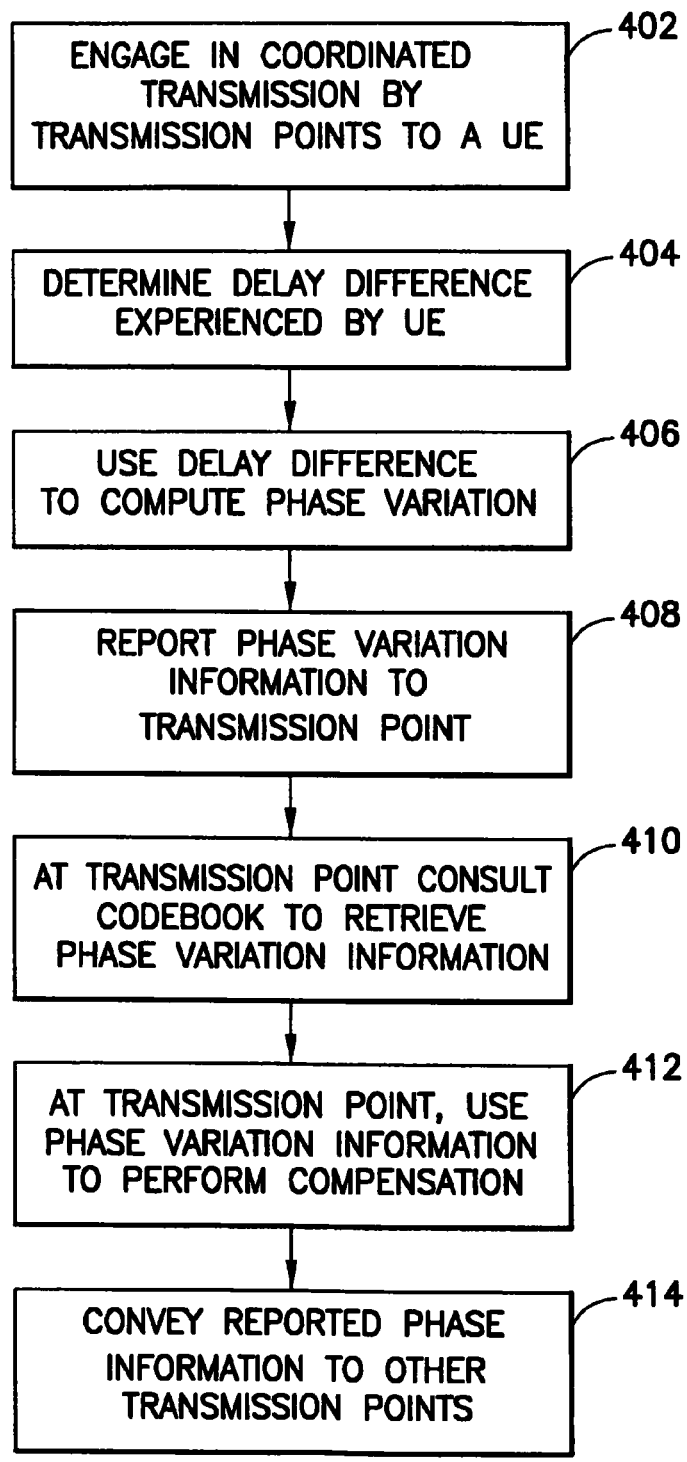
FIG. 4 illustrates a process of coordinated multi-point transmission according to an embodiment of the present invention.

FIG. 4 illustrates the steps of a process 400 according to an exemplary embodiment of the present invention. The process 400 may be carried out in a communication network similar to the network 100, typically employing a plurality of transmission points such as the transmission point 104A and at least one UE such as the UE 106A. At step 402, a plurality of transmission points, engage in coordinated transmission to at least one UE. Coordinated transmission may take any of a number of forms. One example of coordinated transmission is joint processing, wherein each of a plurality of transmission points transmits the same data to a single UE, so that the multi-point transmission appears as a single transmission.

In jointly processed transmissions, geographic separation between transmission points causes propagation delay variation between transmissions of different transmission points. This propagation delay manifests itself as phase modulation and increases frequency selectivity. Therefore, at step 404, a UE receiving a multi-point transmission determines a delay difference for each transmission point k and a reference transmission point $k_0$, for each subcarrier in the transmission. At step 406, the UE computes a phase variation value for each subcarrier in the transmission. The phase variation value may be computed based on the delay difference determined at step 404, or as an alternative, a UE operating directly in the frequency domain may estimate the phase variation based on channel estimates in the frequency domain associated with each transmission point. At step 408 the UE reports the phase variation value information to one or more transmission points.

The UEs and transmission points may each suitably store a codebook comprising phase variation values each indexed to a code, which may comprise a codeword, quantization point, or other unit of data adapted to compactly represent the values. The UE reporting phase variation information may suitably select a codeword associated with the computed phase variation value and transmit the code to the transmission point to which it is providing a report. At step 410, the transmission point receiving the report from the UE may consult its own codebook to retrieve the phase variation information associated with the codeword. At step 412, the transmission point uses the received phase variation information to perform pre-compensation, that is, to manage its transmission so as to reduce interference experienced by the UE and other UEs due to phase variation. One exemplary way in which such reduction may be achieved is by scheduling its transmission so as to reduce propagation delay differences.

At step 414, if the transmission point is reporting phase variation information received from the UE to other transmission points, the transmission point conveys appropriate information to each transmission points to which it is to direct information. The information may be in the form of phase variation values, codewords, some other form of codes, or other suitable information directed toward conveying the needed information to other transmission points.

It will be recognized that in the interest of simplicity the process 400 has been described in terms of one UE computing information and reporting the information to one transmission point, with the transmission point managing its transmission to compensate for or reduce phase variations, but typically a number of transmission points will receive information describing the phase variation experienced by a UE as a result of their transmissions, and coordinate their transmissions accordingly.

FIGS. 5-11 demonstrate how the deterministic phase modulation induced by relative propagation delay differences between two transmission points can be characterized efficiently through a quantized phase variation over a given frequency sub-band, assuming OFDM transmission with 10 MHz bandwidth at 2 GHz carrier frequency.

FIGS. 5-8 illustrate the phase variation within N={1,2,3} PRB(s) as a function of the propagation delay difference between the measured transmission point and the reference transmission point with and without compensation via a quantized version of the phase difference over 1 PRB using an M-PSK complex alphabet, with M comprising the set of {4, 8, 16, 32}.

Figure 5:
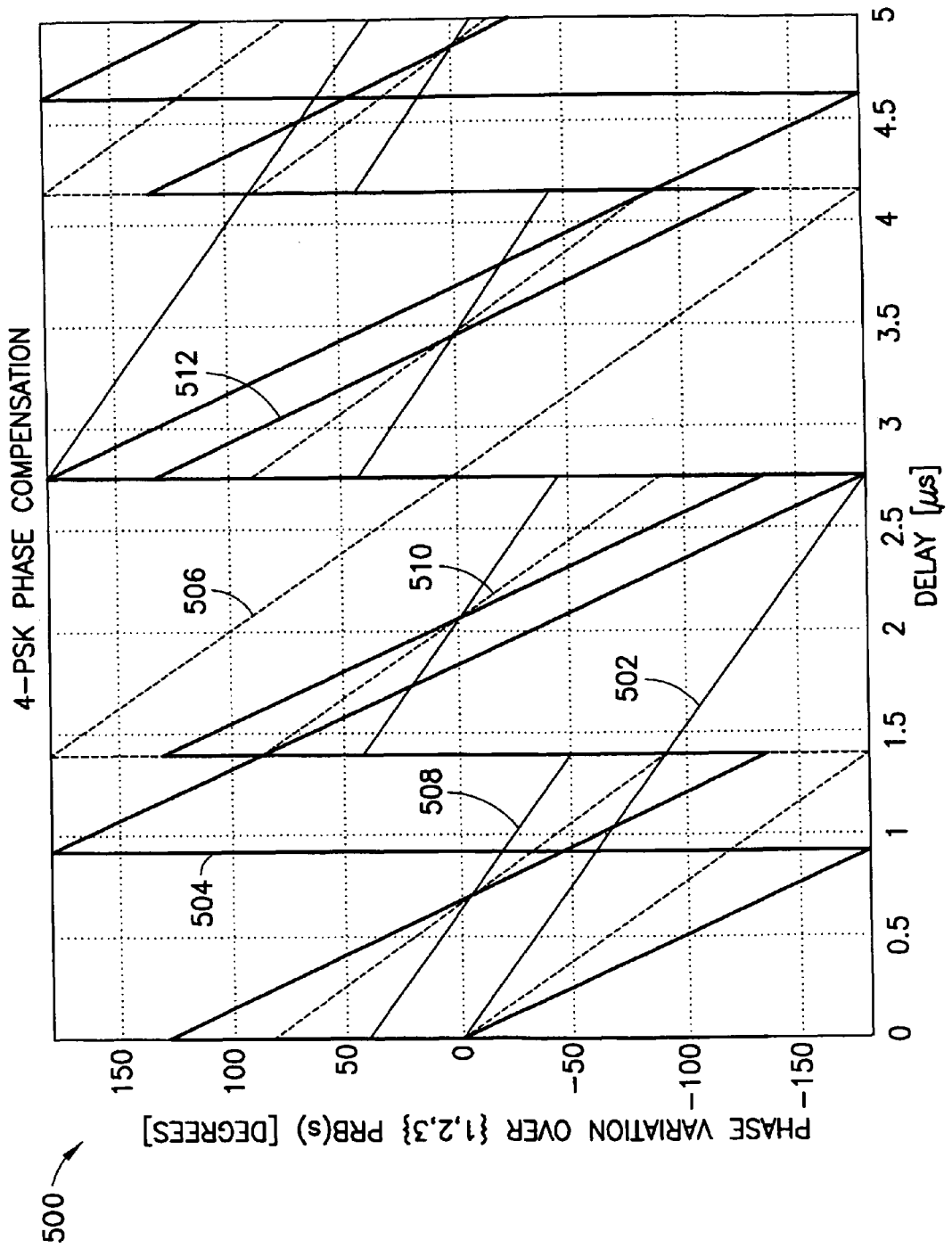
FIGS. 5-11 illustrate graphs showing the effects of various embodiments of the present invention on coordinated multi-point transmissions.

FIG. 5 illustrates a graph 500 showing plots of phase variation within first, second, and third physical resource blocks (PRBs) before and after 4-PSK compensation. The plots 502, 504, and 506 show phase variation for the first, second, and third PRBs, respectively, before compensation, and the plots 508, 510, and 512 show phase variation for the first, second, and third PRBs, respectively, after compensation. It can be seen that the plots representing the variation before compensation show a wide variation, and the plots representing the variation after compensation show a substantial reduction in variation.

Figure 6:
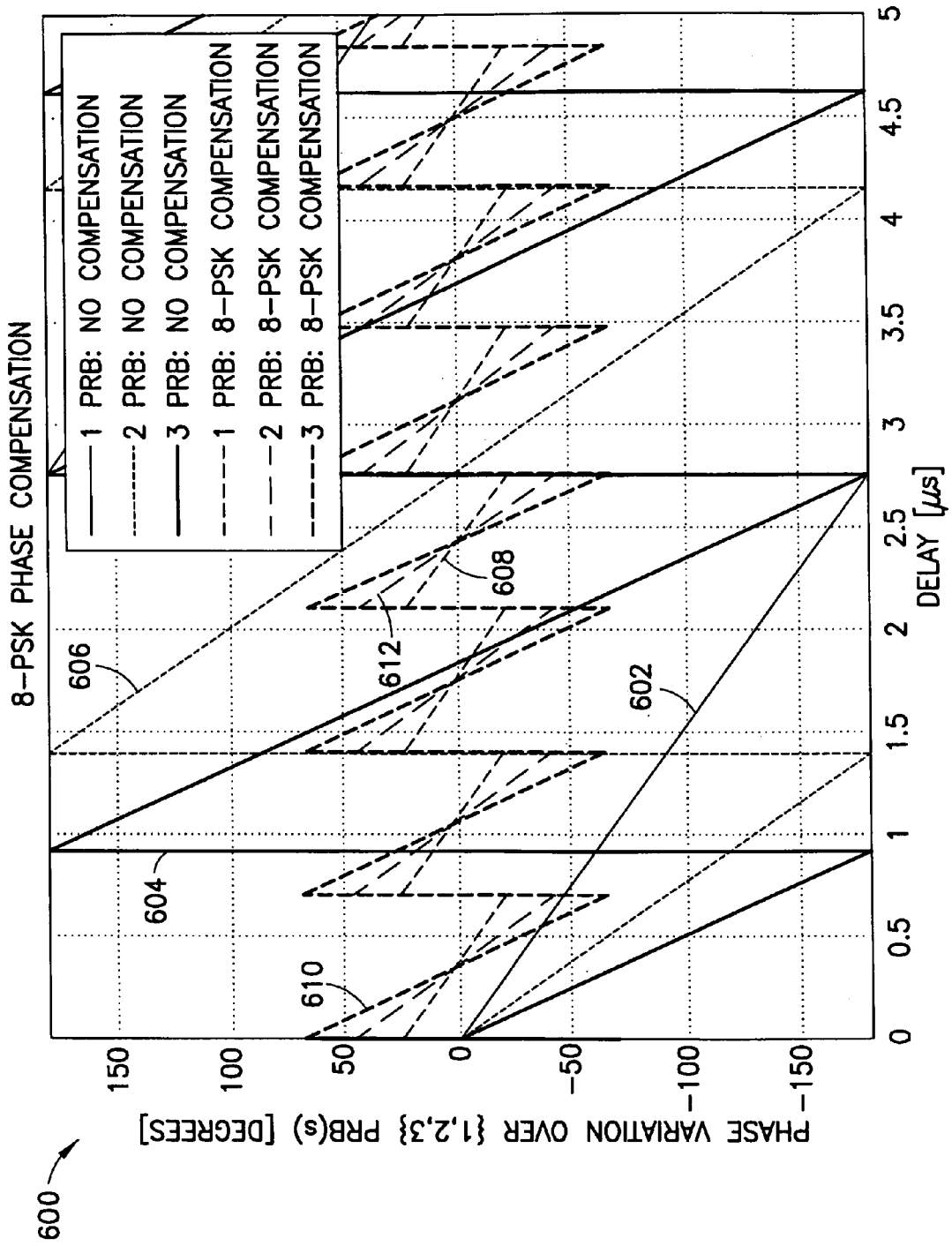

FIG. 6 illustrates a graph 600 showing plots of phase variation within first, second, and third physical resource blocks (PRBs) before and after 8-PSK compensation. The plots 602, 604, and 606 show phase variation for the first, second, and third PRBs, respectively, before compensation, and the plots 608, 610, and 612 show phase variation for the first, second, and third PRBs, respectively, after compensation. It can be seen that the plots representing the variation before compensation show a wide variation, and the plots representing the variation after compensation show a substantial reduction in variation as compared to the 4-PSK compensation illustrated in FIG. 5.

Figure 7:
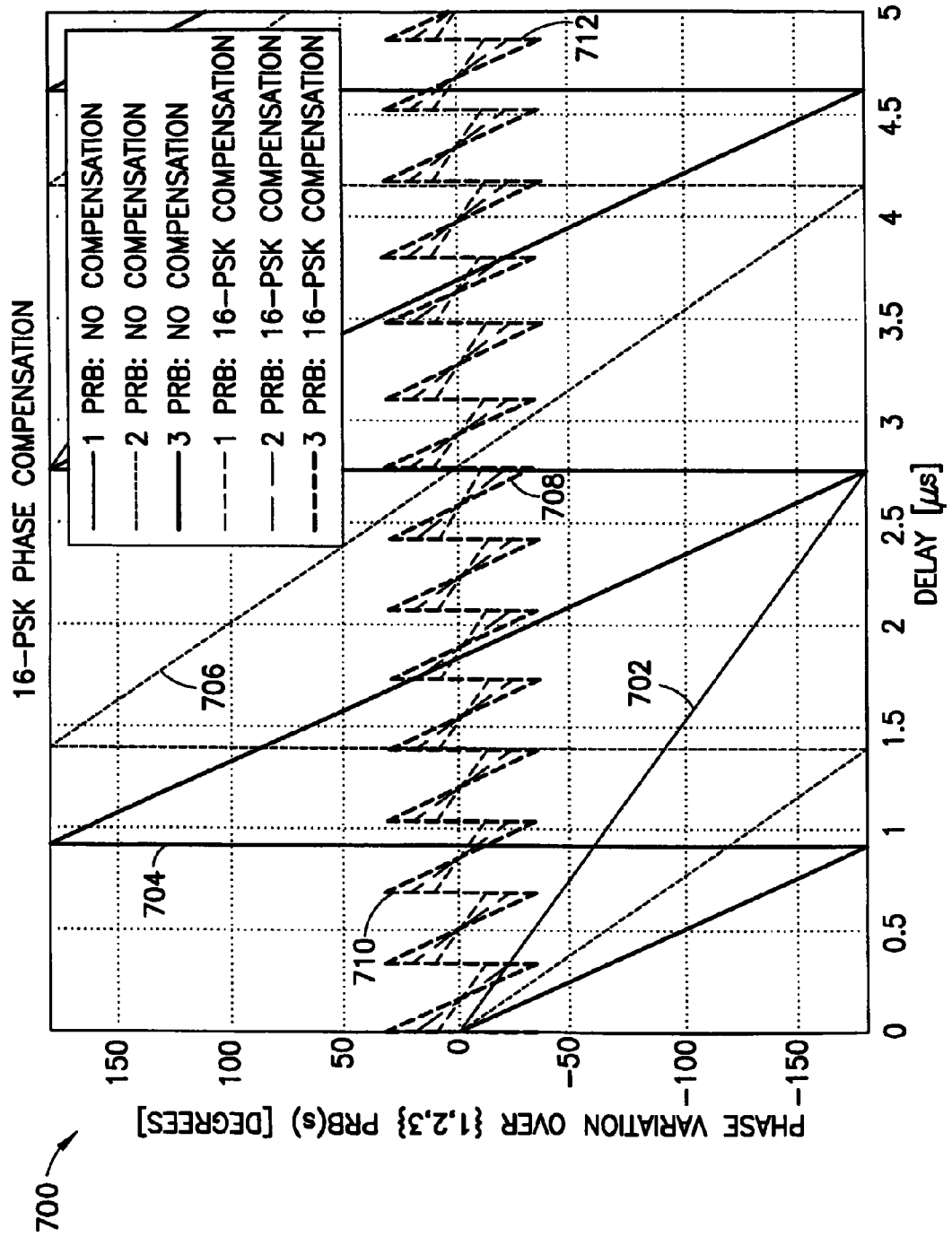

FIG. 7 illustrates a graph 700 showing plots of phase variation within first, second, and third physical resource blocks (PRBs) before and after 16-PSK compensation. The plots 702, 704, and 706 show phase variation for the first, second, and third PRBs, respectively, before compensation, and the plots 708, 710, and 712 show phase variation for the first, second, and third PRBs, respectively, after compensation. It can be seen that the plots representing the variation before compensation show a wide variation, and the plots representing the variation after compensation show a substantial reduction in variation as compared to the 4-PSK compensation illustrated in FIG. 5 and the 8-PSK compensation illustrated in FIG. 6.

Figure 8:
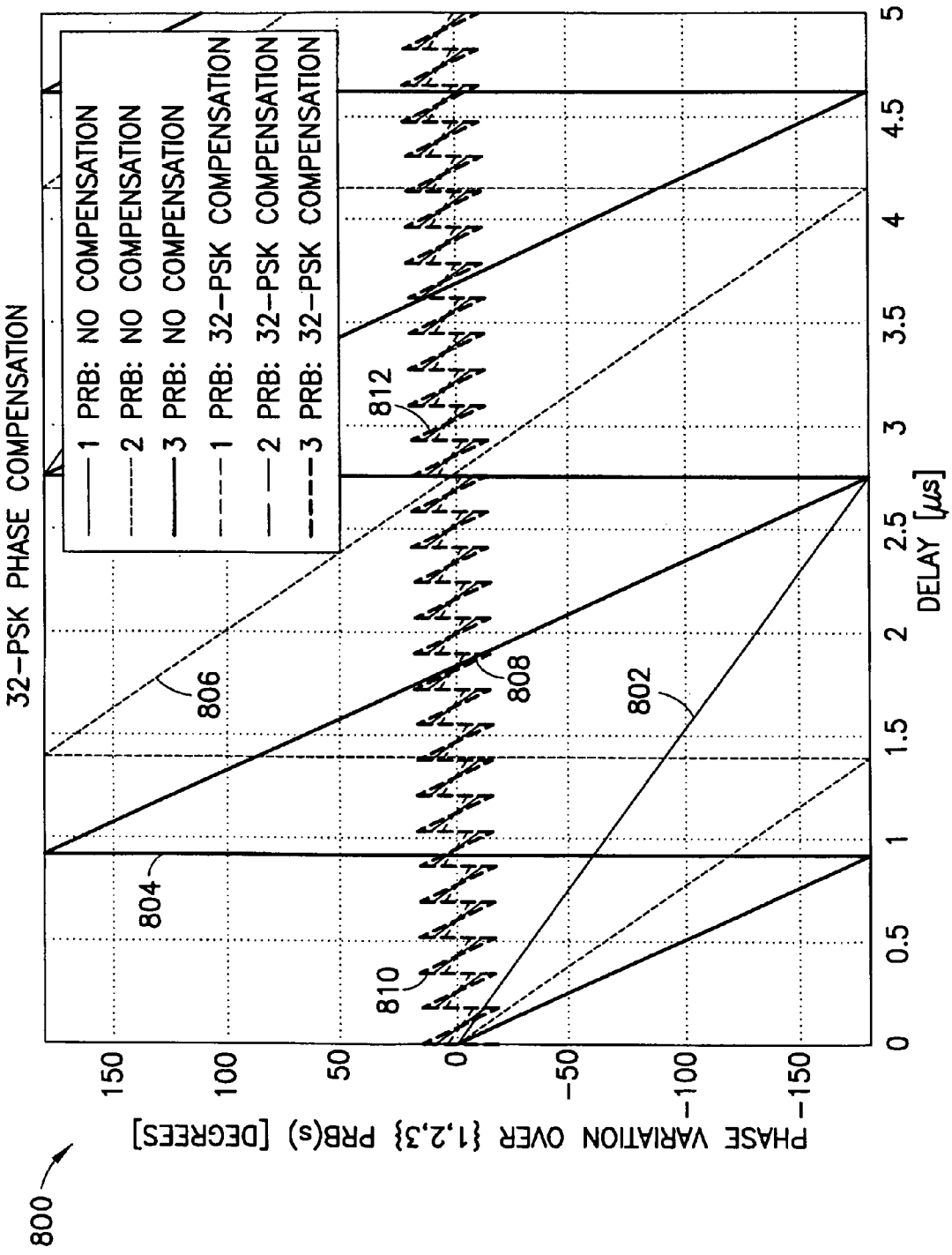

FIG. 8 illustrates a graph 800 showing plots of phase variation within first, second, and third physical resource blocks (PRBs) before and after 32-PSK compensation. The plots 802, 804, and 806 show phase variation for the first, second, and third PRBs, respectively, before compensation, and the plots 808, 810, and 812 show phase variation for the first, second, and third PRBs, respectively, after compensation. It can be seen that the plots representing the variation before compensation show a wide variation, and the plots representing the variation after compensation show a substantial reduction in variation as compared to the 4-PSK, 8-PSK, and 16-PSK compensation illustrated in FIGS. 5, 6, and 7, respectively.

Figure 9:
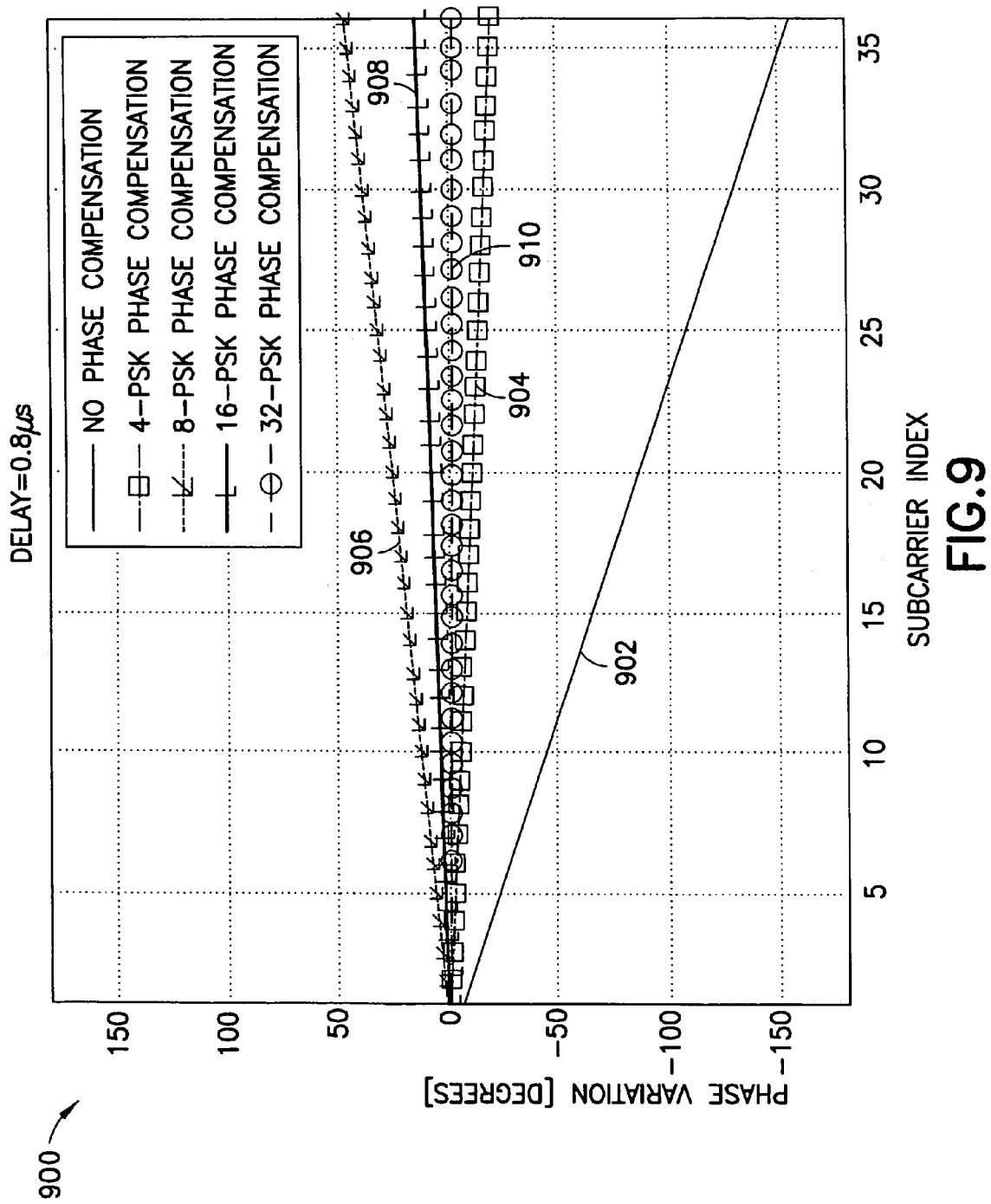
Figure 10:
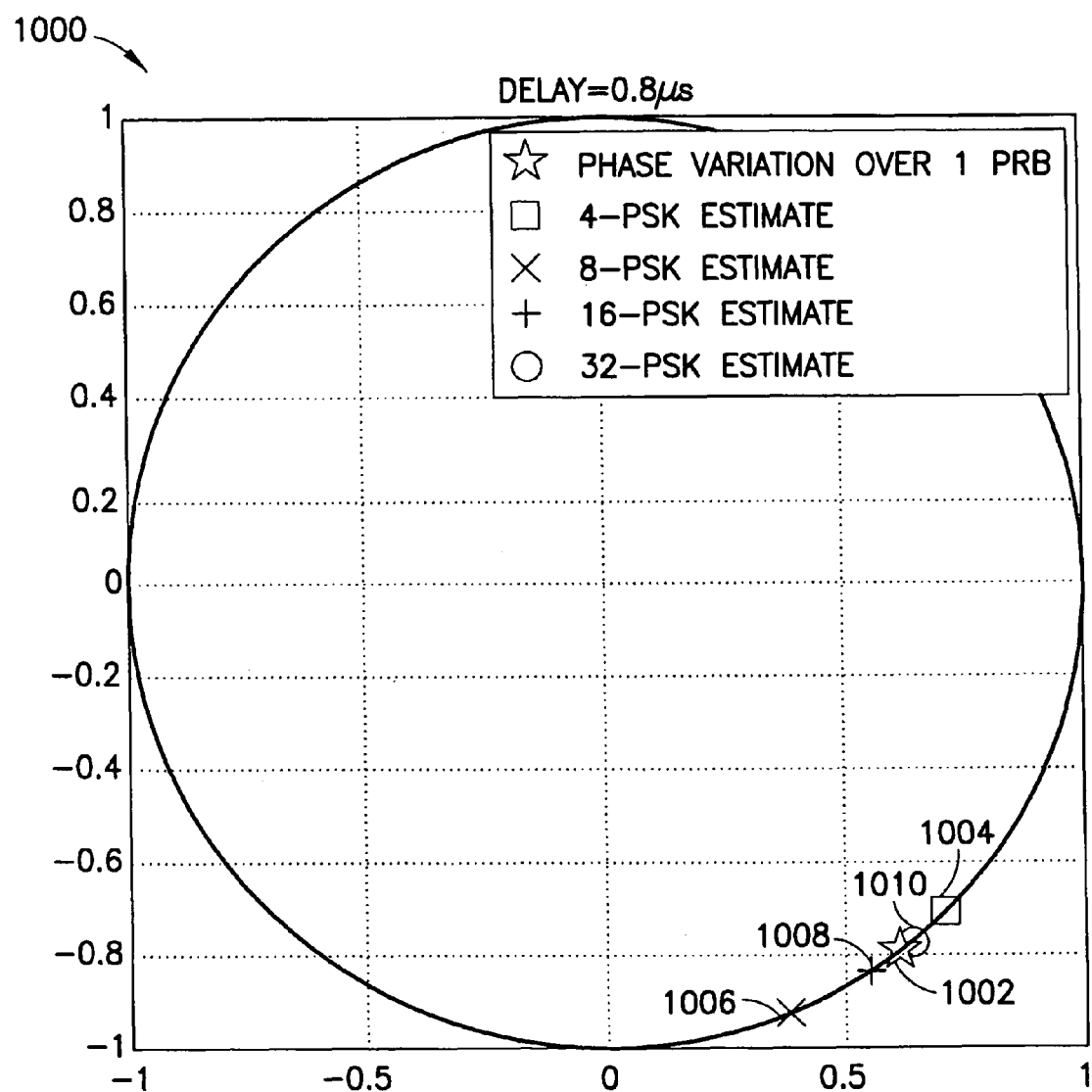

FIG. 9 illustrates a graph 900 showing the phase variation over 36 subcarriers (3 PRBs) before and after M-PSK phase quantization/compensation for a delay of 0.8 microseconds, with M belonging to the set {4, 8, 16, and 32}. The plot 902 illustrates the phase variation without compensation, and the plots 904, 906, 908, and 910 illustrate the phase variation for 4-PSK, 8-PSK, 16-PSK, and 32-PSK compensation, respectively. FIG. 10 illustrates a graph 1000 showing an estimate of the phase variation over one PRB induced by a delay of 0.8 microseconds. The points 1002, 1004, 1006, 1008, and 1010 represent the variations with no compensation, 4-PSK, 8-PSK, 16-PSK, and 32-PSK compensation, respectively.

Figure 11:
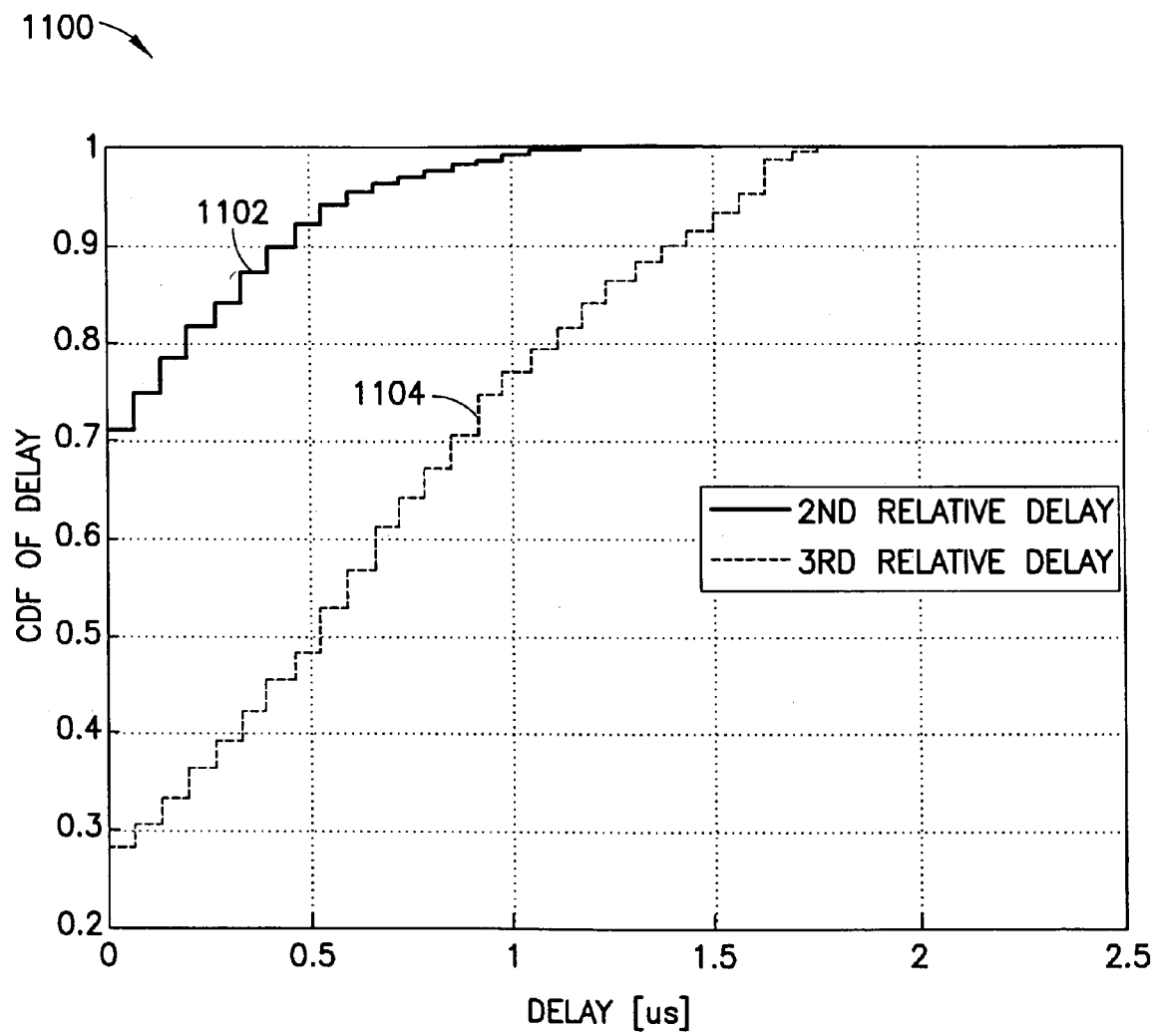

FIG. 11 illustrates a graph 1100 showing the cumulative distribution function extracted from extended link-level simulations of the second and third relative propagation delay with respect to reference transmission point in downlink CoMP transmission, with an exemplary distance between transmission points of 500 meters. The plot 1102 represents the second relative propagation delay and the plot 1104 represents the third propagation delay. A delay of 1 microsecond can be expected to correspond to a distance of approximately 300 meters of difference in length of propagation paths between the two transmission points and the UE.

An examination of the results depicted in FIGS. 1-11 demonstrates that compensating for the phase variation over typical precoding bandwidths of 1-3 PRBs or larger during multi-transmission point joint precoder selection at a UE is needed in the presence of even moderate propagation time differences between CoMP transmission points because the uncompensated variations can be seen to be relatively significant and to severely impact precoding gain. Both 16- and 32-PSK quantization reduces to a considerable extent the phase variation induced by propagation differences over the precoding bandwith, leaving only a relatively small phase modulation with significantly less detrimental impact to precoding gain. Optimization is possible, for example, constraining the range of considered phase variation to [0, 2π] and constraining the corresponding propagation delays accordingly. Furthermore, phase quantization to a single value per measured transmission point may be represented by 3-5 bits. Compared to prior art techniques for dealing with increased frequency selectivity and other problems that arise in CoMP that does not account for propagation delay differences, this value of 3-5 bits represents a very low overhead.

While various specific embodiments of the invention are described above, it will be recognized that a wide variety of implementations may be employed by persons of ordinary skill in the art in accordance with the above description and the claims which follow below.

We claim:

1. An apparatus comprising:
    a processing system comprising at least one processor and a memory storing a set of computer instructions, wherein the processing system is configured to cause the apparatus to at least:
    compute a linear phase variation based at least in part on a propagation delay difference between at least a first radiofrequency transmission from at least a first transmission point and at least a second radiofrequency transmission from at least a second transmission point; and
    transmit information indicating the phase variation for at least the first and the second transmissions;
    wherein the first and the second radiofrequency transmissions each comprise a plurality of sub-bands and wherein the processor causes the apparatus to compute the phase variation for each sub-band based at least in part on the propagation delay between the first and the second transmission with respect to each sub-band.

2. The apparatus of claim 1, wherein the processing system is configured to cause the apparatus to measure a propagation delay difference between the first and the second transmissions and compute the phase variation based on the measured propagation delay difference.

3. The apparatus of claim wherein the processing system is configured to cause the apparatus to estimate the phase variation in the frequency domain.

4. The apparatus of claim 1, wherein the first transmission point is a reference transmission point and wherein the apparatus receives radiofrequency transmissions from each of the second transmission points and a plurality of additional transmission points and computes the phase variation based at least in part on respective propagation delay differences between transmissions from the reference transmission point and each of the second and the additional transmission points.

5. The apparatus of claim 1, wherein the memory stores a codebook indexing each of a plurality of codes to a specific phase variation value and wherein transmission of the information indicating the phase variation comprises transmission of it code indexed to the phase variation value.

6. The apparatus of claim 5, wherein the codebook comprises codes based on a phase shift keying (PSK) complex alphabet.

7. The apparatus of claim 6, wherein the phase shift keying alphabet is selected based at least in part on a quantization error exhibited by a multi-transmission point feedback combiner of at least one of the transmission points.

8. The apparatus of claim 1 wherein the apparatus is a user equipment conducting communication using orthogonal frequency division multiplexing (OFDM) and wherein the apparatus is operative to receive OFDM transmissions from the transmission points.

9. The apparatus of claim 1, wherein the apparatus is configured to provide channel state information feedback in support of coordinated multi-point transmission from multiple transmission points.

10. A method comprising:
    receiving at least a first radiofrequency transmission from a first transmission point and a second radiofrequency transmission from a second transmission point;
    operating a processor to compute a linear phase variation based at least in part on propagation delay differences between transmissions from at least the first and the second transmission point; and
    transmitting information indicating the phase variation to at least one of the transmission points;
    wherein the first and the second radiofrequency transmissions each comprise a plurality of sub-bands and wherein the phase variation is computed based at least in part on the propagation delay with respect to corresponding sub-bands of the first and second transmissions and wherein computing a phase variation comprises computing a phase variation for each sub-band.

11. The method of claim 10, wherein the first transmission point is a reference transmission point, wherein receiving at least first and second radiofrequency transmissions comprises receiving radiofrequency transmissions from each of the second transmission points and a plurality of additional transmission points, and wherein the phase variation is computed based at least in part on respective propagation delay differences between transmissions from the reference transmission point and each of the second and the additional transmission points.

12. The method of claim 10, further comprising storing a codebook indexing each of a plurality of codes to a specific phase variation value and wherein transmission of the information indicating the phase variation comprises transmission of a code indexed to the phase variation value.

13. The method of claim 12, wherein the codebook comprises codes based on a phase shift keying (PSK) complex alphabet.

14. The method of claim 10, wherein the radiofrequency transmissions are orthogonal frequency division multiplexing (OFDM) transmissions.

* * * * *

UNITED STATES PATENT AND TRADEMARK OFFICE
CERTIFICATE OF CORRECTION

PATENT NO. : 8,638,867 B2  
APPLICATION NO. : 13/095241  
DATED : January 28, 2014  
INVENTOR(S) : Timo E. Roman, Tommi T. Koivisto and Karol Schober Page 1 of 1

It is certified that error appears in the above-identified patent and that said Letters Patent is hereby corrected as shown below:

In the Claims

Claim 3, column 16, line 6: Replace "The apparatus of claim wherein" with --The apparatus of claim 1 wherein--.

Claim 5, column 16, line 20-21: Replace "comprises transmission of it code indexed" with --comprises transmission of a code indexed--.

Signed and Sealed this
Eighth Day of April, 2014

Michelle K. Lee
*Deputy Director of the United States Patent and Trademark Office*